(12) United States Patent
Madeira et al.

(10) Patent No.: US 11,691,719 B2
(45) Date of Patent: Jul. 4, 2023

(54) METHOD FOR CONSTRUCTING A ROTOR BLADE INTENDED FOR A ROTORCRAFT, BLADE AND ROTORCRAFT

(71) Applicant: AIRBUS HELICOPTERS, Marignane (FR)

(72) Inventors: Alexandre Madeira, Aix en Provence (FR); Francois Malburet, Coudoux (FR); Lionel Roucoules, Saint Cannat (FR)

(73) Assignee: AIRBUS HELICOPTERS, Marignane (FR)

( * ) Notice: Subject to any disclaimer, the term of this patent is extended or adjusted under 35 U.S.C. 154(b) by 0 days.

(21) Appl. No.: 17/328,896

(22) Filed: May 24, 2021

(65) Prior Publication Data

US 2021/0371095 A1    Dec. 2, 2021

(30) Foreign Application Priority Data

May 29, 2020    (FR) ...................................... 2005703

(51) Int. Cl.
*B64C 27/467* (2006.01)
*B64C 27/473* (2006.01)

(52) U.S. Cl.
CPC .......... *B64C 27/467* (2013.01); *B64C 27/473* (2013.01)

(58) Field of Classification Search
None
See application file for complete search history.

(56) References Cited

U.S. PATENT DOCUMENTS

| 3,399,731 | A | 9/1968 | Giles, Jr. |
| 4,392,781 | A | 7/1983 | Mouille et al. |
| 4,911,612 | A | 3/1990 | Rodde et al. |
| 6,361,279 | B1 | 3/2002 | Rodde et al. |
| 2015/0104314 | A1 | 4/2015 | Zamponi et al. |
| 2019/0193851 | A1 | 6/2019 | Alfano et al. |
| 2020/0140077 | A1* | 5/2020 | Acee ...................... B64C 27/46 |

FOREIGN PATENT DOCUMENTS

| EP | 2860109 A1 | 4/2015 |
| FR | 2626841 A1 | 8/1989 |
| FR | 2765187 A1 | 12/1998 |
| FR | 3075757 A1 | 6/2019 |

OTHER PUBLICATIONS

French Search Report for French Application No. FR2005703, Completed by the French Patent Office, dated Feb. 12, 2021, 14 pages.

\* cited by examiner

*Primary Examiner* — Juan G Flores
(74) *Attorney, Agent, or Firm* — Brooks Kushman P.C.

(57) ABSTRACT

A blade in which the aerodynamic profiles of a blade root, a blade neck and a central part of a profiled zone of the blade respectively comprise a leading edge section and a trailing edge section that are symmetrical to each other relative to an axis of symmetry. The present disclosure also concerns a method for constructing such a blade. The axis of symmetry is perpendicular to a segment connecting the leading edge to the trailing edge of each profile and is positioned in the middle of the segment. An intermediate upper surface section and an intermediate lower surface section connect the leading edge section and the trailing edge section in order to respectively form a lower surface of the aerodynamic profile.

17 Claims, 7 Drawing Sheets

METHOD FOR CONSTRUCTING A ROTOR BLADE INTENDED FOR A ROTORCRAFT, BLADE AND ROTORCRAFT

CROSS REFERENCE TO RELATED APPLICATIONS

This application claims priority to French patent application No. FR 20 05703 filed on May 29, 2020, the disclosure of which is incorporated in its entirety by reference herein.

TECHNICAL FIELD

The present disclosure relates to the field of aerodynamic surfaces and, more particularly, aerodynamic surfaces forming a rotary wing for a rotorcraft.

The present disclosure concerns a method for constructing a rotor blade intended, for example, for a rotorcraft with high forward speeds due to the symmetry of its aerodynamic profiles and such a rotor blade and a rotorcraft equipped with such blades.

BACKGROUND

A rotorcraft, which may also be referred to as a "rotary-wing aircraft", conventionally comprises a fuselage and at least one lift rotor providing at least partial lift, and indeed propulsion, for the aircraft. A rotorcraft may also comprise an anti-torque device suitable for opposing the yaw torque exerted by the lift rotor on the fuselage of the rotorcraft and also helping control the yaw movements of the rotorcraft. An anti-torque device comprises, for example, an auxiliary rotor generally situated at the rear of the rotorcraft, at the end of a tail boom of the rotorcraft.

A rotorcraft may also comprise one or more propellers positioned, for example, to either side of the fuselage, and optionally on a wing of the rotorcraft. The propellers can make it possible to reach very high forward speeds, for example of the order of 200 to 250 knots, one knot being equal to 1.151 miles per hour.

Each rotor, whether it is a lift rotor or an auxiliary anti-torque rotor, comprises a rotating hub and several blades. Each blade is connected to the hub and is rotated by the hub.

Conventionally, a rotor blade extends longitudinally along its span from a first end intended to be fastened to the hub to a second free end. It is noted that the term "longitudinal" should be understood to refer to the direction of the span of the blade. Thus, the blade extends radially with respect to the rotor from the first end towards the second end. The blade also extends transversely from a leading edge towards a trailing edge of the blade.

Longitudinally, the blade comprises a blade root, a profiled zone and a blade neck linking the blade root to the profiled zone. The blade root provides a mechanical connection between the blade and the hub, optionally via a structural joining device, and the structural strength of this mechanical connection. The blade neck is a transition zone between the blade root and the profiled zone. The profiled zone is responsible for the main aerodynamic performance of the blade and, in particular, the lift of the blade, this profiled zone representing a relatively long portion of the blade. The blade comprises successive cross-sections positioned radially, spanwise, along a given rotor radius with respect to an axis of rotation of the rotor. Each cross-section, in particular of the profiled zone, may be defined by an aerodynamic profile. For reasons of simplification, such an aerodynamic profile is referred to hereinafter by the term "profile".

Existing aerodynamic profiles used frequently for the profiled zone of rotorcraft rotor blades are, for example, defined according to the NACA families or indeed the OA families, the OA families being described, for example, in documents FR 2 626 841 and FR 2 765 187.

The blade root of a blade is connected to the hub of the rotor by a structural joining device that may be faired in order to reduce, in particular, its aerodynamic drag and the wake generated. Such a faired structural joining device is generally referred to by the term "sleeve".

When the rotor is rotating and during forward flight of the rotorcraft, a blade is described as an "advancing blade" when it rotates moving from the rear of the rotorcraft towards the front of the rotorcraft. Conversely, a blade is described as a "retreating blade" when it rotates moving from the front of the rotorcraft towards the rear of the rotorcraft.

A rotorcraft has the advantage of being able to travel both at high forward speeds during cruising flights and at very low forward speeds and of performing hovering flight as well. The forward speeds of a rotorcraft can be even higher when the rotorcraft has one or more propellers.

During hovering flight or when flying at low forward speeds, each blade, whether it is advancing or indeed retreating, is swept by a flow of air generated mainly by the rotation of the rotor and, therefore, by the rotation of the blades. This flow of air thus sweeps each blade from its leading edge towards its trailing edge, which generates aerodynamic forces, in particular an aerodynamic lift force that at least lifts the rotorcraft.

During forward flight at higher forward speeds, each blade is swept by a combined air flow resulting from the rotation of the rotor and the forward travel of the rotorcraft.

For an advancing blade, these two movements of rotation of the rotor and forward travel of the rotorcraft are added together such that the combined air flow sweeps each blade from its leading edge towards its trailing edge.

For a retreating blade, these two movements of rotation of the rotor and of forward travel of the rotorcraft are opposed, giving rise to two scenarios. When the local speed of the blade caused by the rotation of the blade is higher than the speed of translation of the blade caused by the forward travel of the rotorcraft, the combined air flow sweeps each blade from its leading edge towards its trailing edge.

When the local speed of the blade caused by the rotation of the blade is lower than the speed of translation of the blade caused by the forward travel of the rotorcraft, the air flow is inverted and the combined air flow sweeps each blade from its trailing edge towards its leading edge. This inversion of the air flow takes place in a particular region of the rotor referred to by a person skilled in the art as the "inversion circle".

This inversion circle is tangent to a longitudinal direction of the rotorcraft at the axis of rotation of the rotor and generally covers the blade root, the blade neck and a relatively long portion of the profiled zone of the retreating blades. The inversion circle thus extends from the axis of rotation of the rotor to a point on the profiled zone of the blade. The radius of the inversion circle depends on the speed of rotation of the blade and the forward speed of the rotorcraft. In particular, this radius of the inversion circle depends on the forward speed ratio defined as the ratio of the forward speed of the rotorcraft to the velocity component of the blade tip caused by the rotation of the rotor alone. The higher the forward speed ratio, the larger the inversion circle.

Moreover, in the case of a rotorcraft travelling at very high speeds, in particular when it has one or more propellers, the speed of rotation of the lift rotor can be reduced, which tends to increase the forward speed ratio and, consequently, the radius of the inversion circle.

Outside the inversion circle, the combined air flow sweeps each blade, whether it is advancing or retreating, in the typical manner, from the leading edge towards the trailing edge, resulting in expected aerodynamic behavior of each blade.

Inside the inversion circle, the combined air flow sweeps each blade from the trailing edge towards the leading edge, and the aerodynamic behavior of the blade is therefore not optimal.

For example, this aerodynamic behavior of the blades of a lift rotor results in an increase in the stalling moment of the blade in the inversion circle and in an increase in the forces required in order to control a variation in the pitch of the blades of this lift rotor.

Moreover, a wake may appear at the rear of a lift rotor, this wake being capable of having high-amplitude instabilities as well as a frequency signature of the harmonic type or broadband type or indeed a combination of the two. This wake may come into contact with components of the rotorcraft situated to the rear of the lift rotor, and can result in the appearance of the phenomenon referred to as "tail-shake", and thus a reduction in the flying qualities of the rotorcraft.

The profiled zone of the blade is generally formed by an aerodynamic shell referred to as a "thin" shell, the relative thickness of each profile of this thin shell being, for example, less than or equal to 13%. For information, the relative thickness of a profile is the ratio between the maximum thickness of this profile and its chord, the chord being the distance between the leading edge and the trailing edge of the profile.

The blade neck and the blade root are generally formed by shells referred to as "thick" shells, the relative thickness of which is greater, for example between 20% and 100%. The main function of the blade neck and the blade root is not to generate an aerodynamic lift force, but to give the blade stiffness and mechanical strength while limiting the aerodynamic drag generated. In particular, the blade root can be constructed from profiles having virtually rectangular cross-sections while the blade neck can be constructed from profiles that transition from virtually rectangular cross-sections to thick, pseudo-elliptical shapes.

For example, document FR 3 075 757 describes thick aerodynamic shells intended to form a blade neck or a blade sleeve, the aim of which is to improve the aerodynamic behavior of this zone of the blades during forward travel of the rotorcraft, both when the blade is advancing and retreating. One particular aim of said thick aerodynamic shell is to reduce the vibrations generated by a rotor wake on a tail boom or indeed on an empennage of the rotorcraft.

The technological background of the disclosure also includes documents EP 2 860 109, U.S. Pat. Nos. 4,392,781 and 3,399,731.

SUMMARY

The aim of the present disclosure is therefore to overcome the above-mentioned limitations by proposing an alternative method for constructing a rotor blade intended for a rotorcraft, for example but not exclusively a rotorcraft with high forward speeds, and such a rotor blade optimized, in particular, in order to limit the forces required to control the pitch of the blades, and a rotorcraft equipped with such blades.

The object of the present disclosure is, for example, a method for constructing a blade for a rotorcraft rotor, the blade extending in a longitudinal direction X spanwise from a first end intended to be connected to a hub of the rotor towards a second free end, and in a transverse direction Y from a leading edge towards a trailing edge, the blade comprising a blade root, a profiled zone and a blade neck situated between the blade root and the profiled zone, the blade comprising a series of profiles.

The blade root provides a mechanical connection between the blade and the hub, and the structural strength of this mechanical connection. The blade neck is a transition zone between the blade root and the profiled zone. The profiled zone is responsible for the main aerodynamic performance of the blade and, in particular, the lift of the blade.

The method for constructing a blade for a rotorcraft rotor according to the disclosure is remarkable in that it comprises the following steps:

determining a leading edge section of each profile for the blade root, the blade neck and a central part of the profiled zone adjacent to the blade neck;

determining a trailing edge section of each profile for the blade root, the blade neck and the central part of the profiled zone by axial symmetry of the leading edge section, along an axis of symmetry AS perpendicular to a segment s connecting said leading edge to the trailing edge and positioned in the middle of this segment s;

determining an intermediate upper surface section connecting the leading edge section and the trailing edge section in order to form an upper surface of the profile; and determining an intermediate lower surface section connecting the leading edge section and the trailing edge section in order to form a lower surface of the profile.

Therefore, the method according to the disclosure can be used to obtain a blade comprising, for each profile of said central part of the profiled zone and the blade root and the blade neck, a trailing edge section that is axially symmetrical to the leading edge section. Over the remainder of the profiled zone of the blade, the trailing edge of each profile may, for example, be tapered or thin according to profiles used conventionally for a blade of a lift rotor or an auxiliary anti-torque rotor of a rotorcraft.

The aerodynamic behavior of the central part of the profiled zone of the blade is thus substantially identical whether an air flow sweeps this central part of the profiled zone from the leading edge towards the trailing edge or indeed from the trailing edge towards the leading edge. Similarly, although less significantly, the aerodynamic behavior of the blade root and the blade neck of the blade is also substantially identical whether an air flow sweeps the blade root and the blade neck from the leading edge towards the trailing edge or indeed from the trailing edge towards the leading edge.

Consequently, such a blade used for a main lift rotor of a rotorcraft or indeed for an auxiliary rotor of a rotorcraft can make it possible to improve the behavior of the blade, of the rotor equipped with such blades and, therefore, of the rotorcraft during forward flight of the rotorcraft, in particular at high speeds, and indeed very high speeds.

Indeed, during forward flight, the blade root, the blade neck and the central part of the profiled zone can be located in the inversion circle of the air flow sweeping each blade. Therefore, the blade root, the blade neck and the central part of the profiled zone of a retreating blade can be swept by a combined air flow moving from the trailing edge towards the leading edge, depending on the forward speed of the rotorcraft and the speed of rotation of the rotor.

The trailing edge section that is axially symmetrical to the leading edge section makes it possible to have a non-turbulent flow of air along the upper and lower surfaces of the portion of the blade situated in the inversion circle and, therefore, to have an aerodynamic lift force generated by this portion of the blade according to the disclosure compared to a blade with a tapered or thin trailing edge or indeed compared to an elliptical aerodynamic surface sometimes used for a blade root or a blade neck, for example. Similarly, the aerodynamic drag force generated by this portion of the blade situated in the inversion circle is also reduced by the presence of this trailing edge section symmetrical to the leading edge section. The aerodynamic stall point of the blade when it is retreating is also modified, which helps improve the aerodynamic behavior of the blade.

Moreover, the trailing edge section, which is axially symmetrical to the leading edge section, is thicker than a tapered or thin trailing edge section used conventionally and makes it possible to reduce the forces for controlling the pitch of the blade.

These improvements are particularly significant for the central part of the profiled zone of the blade that is situated in the inversion circle of the rotor. The larger the radius of the inversion circle, the greater these improvements.

The blade root, the blade neck and the central part of the profiled zone, the trailing edge section of each profile of which is axially symmetrical to the leading edge section, thus extend within an inversion circle of maximum radius for the rotor of the rotorcraft for which the blade is intended. The central part of the profiled zone is situated entirely inside this inversion circle of maximum radius and can stop at the periphery of the inversion circle. The maximum radius depends on the maximum forward speed of the rotorcraft and the speed of rotation of the rotor associated with the maximum forward speed of the rotorcraft. The maximum forwarded travel speed of the rotorcraft is the highest forward speed that the rotorcraft can reach during level cruise flight. Regardless of the value of its radius, the inversion circle is tangent to a longitudinal direction of the rotorcraft at the axis of rotation of the rotor.

For example, in the case of a rotorcraft referred to as a "conventional" rotorcraft, i.e., not comprising a propulsion propeller and having a maximum forward speed of the order of 100 to 180 knots, the maximum radius of the inversion circle can be of the order of 30 to 40% of the total span of the blade from the axis of rotation of the rotor. In the case of a rotorcraft comprising one or more propellers and flying at very high forward speeds, for example of the order of 200 to 250 knots, the maximum radius of the inversion circle can be of the order of 60% of the total span of the blade from the axis of rotation of the rotor. The central part of the profiled zone can thus extend up to a distance less than or equal to 60% of a total span of the blade from the axis of rotation of the rotor.

It is therefore understood that the higher the forward speed of the rotorcraft, the greater the improvements contributed by the disclosure.

The method for constructing a blade for a rotorcraft rotor according to the disclosure can also comprise one or more of the following features, taken individually or in combination.

In one aspect, the method for constructing a blade for a rotorcraft rotor according to the disclosure can be carried out solely from a leading edge section for each profile of the blade root, the blade neck and the central part of the profiled zone.

The leading edge section extends from the leading edge to a point upstream from a point of maximum thickness of the profile. The leading edge section extends, for example, over a distance of between 20 and 45% of a chord c of the profile according to a segment s of a straight line connecting the leading edge and the trailing edge of each profile, the chord c being equal to the distance between the leading edge and the trailing edge.

In one aspect, the method for constructing a blade for a rotorcraft rotor according to the disclosure can also be taken from an existing profile, referred to as a "standard" profile, the leading edge section being taken from this standard profile. A standard profile for a rotorcraft rotor blade can be defined, for example, according to the NACA families or indeed the OA families.

Thus, after having chosen a standard profile for the blade, the first step of determining a leading edge section can comprise the following sub-steps:

defining a cutting plane situated between the leading edge and the point of maximum thickness of the standard profile; and defining the leading edge section by cutting the standard profile along the cutting plane, the leading edge section comprising the leading edge.

The cutting plane thus passes through a point of the upper surface of the standard profile where the tangent to the upper surface has a positive direction coefficient and through a point of the lower surface of the standard profile where the tangent to the lower surface has a negative direction coefficient.

The cutting plane is, for example, situated at a distance from the leading edge of between 20 and 45% of the chord c of the standard profile along the segment s connecting the leading edge and the trailing edge of the standard profile. Moreover, the cutting plane can be perpendicular to the segment s.

The leading edge section can thus be defined by cutting the standard profile along the cutting plane, the leading edge section being constituted by the part of the profile included between the leading edge and the cutting plane.

The trailing edge section of each profile of the blade root, the blade neck and the central part of the profiled zone can then be determined by axial symmetry of the leading edge section. Axial symmetry can also be referred to as "orthogonal symmetry". To this end, the second step of determining a trailing edge section can comprise the following sub-steps:

defining a segment s connecting the leading edge and the trailing edge of the profile;

defining an axis of symmetry AS, the axis of symmetry AS being a right bisector of the segment s; and defining the trailing edge section by axial symmetry of the leading edge section according to the axis of symmetry AS.

These sub-steps make it possible, in particular, to define the axis of symmetry AS relative to which the axial symmetry of the leading edge section is achieved in order to determine the trailing edge section. This axis of symmetry AS is perpendicular to the segment s and positioned in the middle of this segment s.

In one aspect, during the third step of determining the intermediate upper surface section, the intermediate upper surface section is determined so as to be tangent to the leading edge section and to the trailing edge section. The intermediate upper surface section can be defined, for example, by a polynomial of degree greater than or equal to two or indeed by a Bézier curve.

Similarly, during the fourth step of determining the intermediate lower surface section, the intermediate lower surface section is determined so as to be tangent to the leading edge section and to the trailing edge section. The intermediate lower surface section can be defined, for example, by a polynomial of degree greater than or equal to two or indeed by a Bézier curve.

Moreover, the intermediate upper surface section and the intermediate lower surface section can be defined such that the maximum thickness of the profile is substantially unchanged relative to the standard profile when the leading edge section is taken from a standard profile. However, the maximum thickness of the profile can be modified after defining the intermediate upper surface section and the intermediate lower surface section and may lie, for example, within a range [95%,105%] of the maximum thickness of the standard profile when the leading edge section is taken from a standard profile.

In one aspect, the intermediate upper surface section and the intermediate lower surface section can be defined so as to be respectively axially symmetrical relative to the axis of symmetry AS. Each profile formed by a leading edge section, a trailing edge section and the intermediate upper surface and lower surface sections by the method according to the disclosure are thus axially symmetrical relative to the axis of symmetry AS. Each profile can thus be referred to as a "mirror profile" relative to the axis of symmetry AS.

The present disclosure also relates to a method for manufacturing a blade for a rotorcraft rotor comprising a step of manufacturing the blade aiming to manufacture a blade according to the profiles formed by a leading edge section, a trailing edge section and the intermediate upper surface and lower surface sections defined for the blade root, the blade neck and the central part of the profiled zone by the method for constructing a blade as previously described.

The present disclosure also relates to a blade for a rotorcraft rotor, the blade extending in a longitudinal direction X spanwise from a first end intended to be connected to a hub of the rotor towards a second free end, and in a transverse direction Y from a leading edge towards a trailing edge, the blade comprising a blade root, a profiled zone and a blade neck situated between the blade root and the profiled zone, the blade comprising a series of profiles.

This blade is remarkable in that, for the blade root, the blade neck and a central part of the profiled zone, each profile comprises a leading edge section and a trailing edge section that are axially symmetrical to each other along the axis of symmetry AS perpendicular to a segment s connecting the leading edge to the trailing edge and positioned in the middle of the segment s. This blade can thus be defined and constructed according to the previously described method.

In this way, for the blade root, the blade neck and the central part of the profiled zone, each profile can be symmetrical along the axis of symmetry AS.

The present disclosure also relates to a rotorcraft rotor, the rotor comprising a hub and at least two blades as previously described.

The present disclosure finally relates to a rotorcraft comprising at least one rotor equipped with at least two blades as previously described.

BRIEF DESCRIPTION OF THE DRAWINGS

The disclosure and its advantages appear in greater detail from the following description of examples given by way of illustration with reference to the accompanying figures, in which.

DETAILED DESCRIPTION

Elements present in more than one of the figures are given the same references in each of them.

Figure 1:
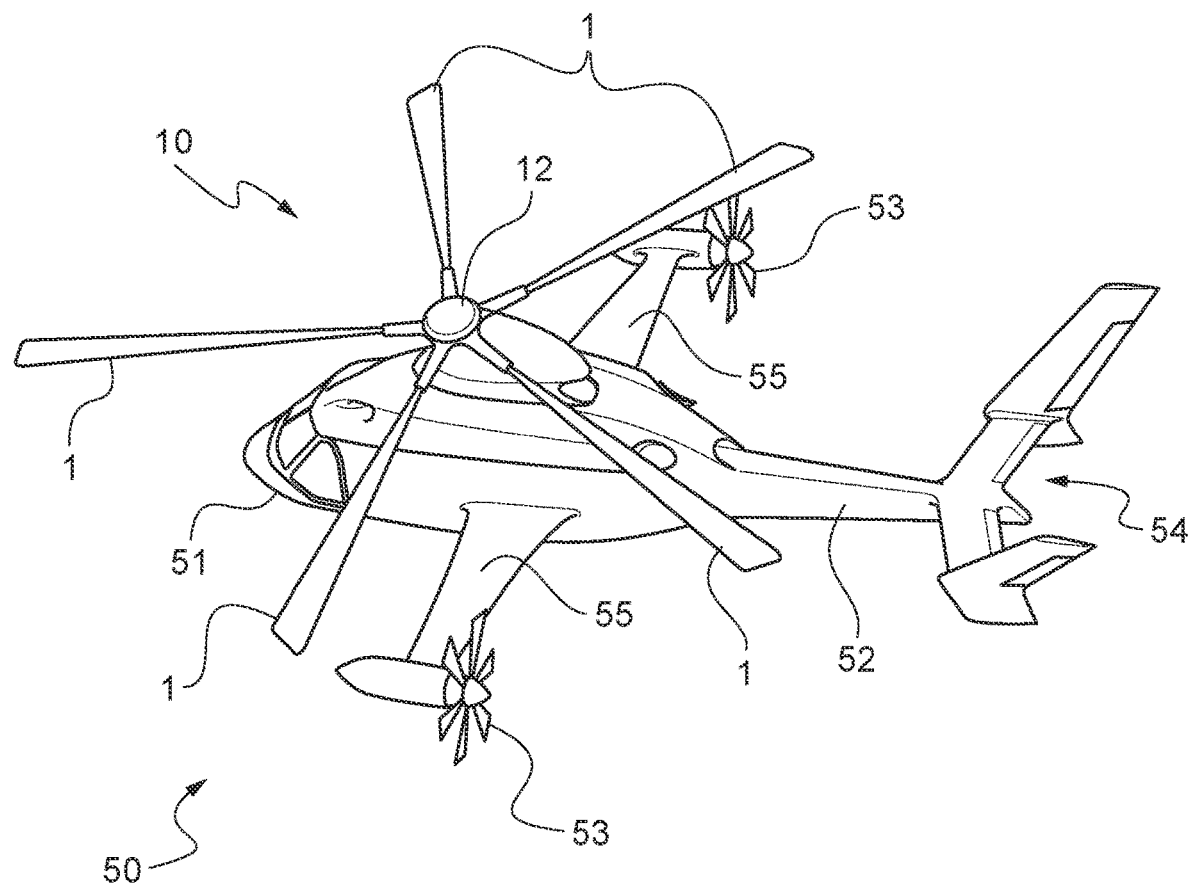
FIG. 1 is a perspective view of a rotorcraft according to the disclosure.

FIG. 1 shows a rotorcraft 50 comprising a fuselage 51 and a main lift rotor 10. A rotorcraft 50 may also comprise two half-wings 55 positioned to either side of the fuselage 51, two propellers 53 arranged respectively at the end of a half-wing 55, a tail boom 52 and an empennage 54. The main rotor 10 comprises a rotating hub 12 and blades 1, for example five blades 1 as shown in FIG. 1.

As a result of the presence of the two propellers 53, this rotorcraft 50 can fly at very high forward speeds of the order of 200 to 250 knots.

Figure 2:
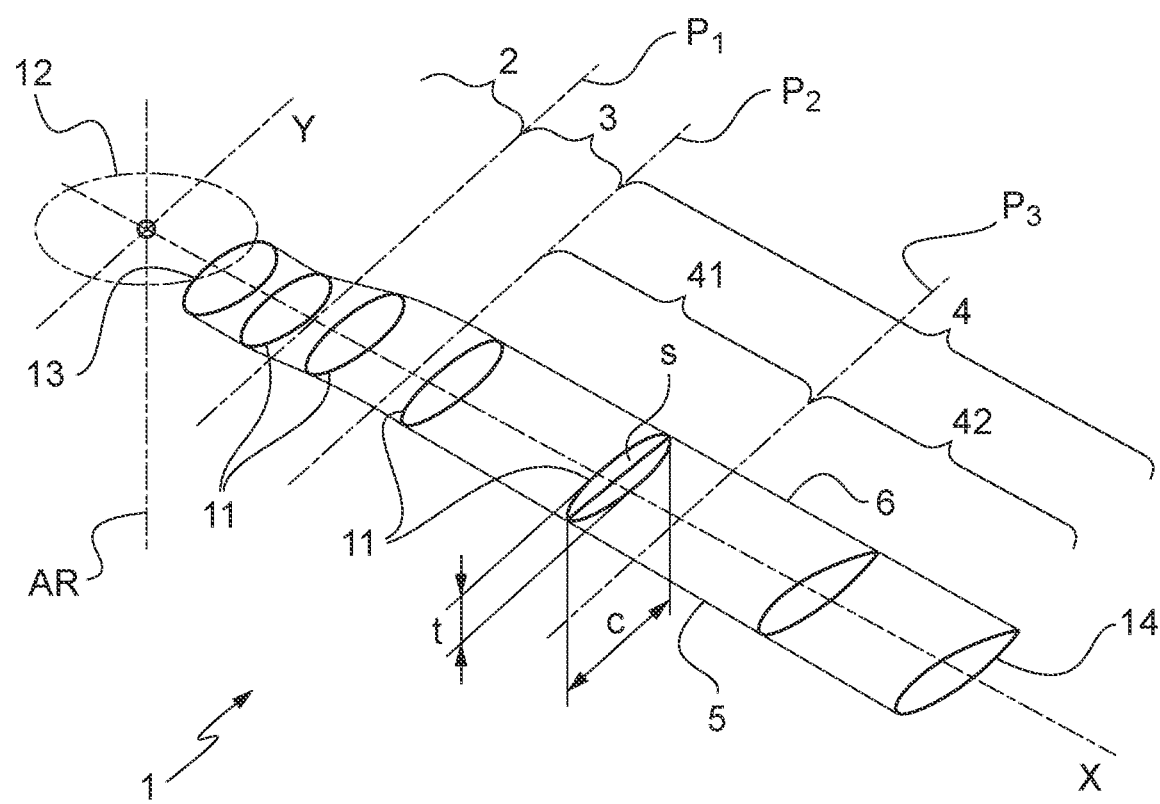
FIG. 2 is a perspective view of a blade of the rotorcraft.

FIG. 2 shows a blade 1 of the main rotor 10 of this rotorcraft 50. The blade 1 extends in a longitudinal direction X spanwise from a first end 13 intended to be connected to the hub 12 of the main rotor 10 towards a second free end 14. The blade 1 comprises a blade root 2, a profiled zone 4 and a blade neck 3 situated, in a longitudinal direction X, spanwise, between the blade root 2 and the profiled zone 4. The blade root 2 comprises the first end 13 and extends up to a first plane P1. The blade neck extends from the first plane P1 up to a second plane P2. The profiled zone 4 extends from the second plane P2 up to the second free end 14 of the blade 1. The planes P1 and P2 are, for example, perpendicular to the longitudinal direction X.

The blade 1 also extends in a transverse direction Y, perpendicular to the longitudinal direction X, from a leading edge 5 towards a trailing edge 6.

The blade 1 comprises a series of profiles 11 positioned in planes parallel to a transverse plane perpendicular to the spanwise longitudinal direction X. Each profile 11 comprises an upper surface 17 and a lower surface 18 connecting the leading edge 5 and the trailing edge 6. Each profile 11 can be characterized by a chord c equal to the distance between the leading edge 5 and the trailing edge 6, a thickness t equal to a maximum distance between the upper surface 17 and the lower surface 18 measured perpendicular to a segment s connecting the leading edge 5 and the trailing edge 6 of the profile 11 and a relative thickness t/c equal to the ratio of the thickness t to the chord c.

Figure 3:
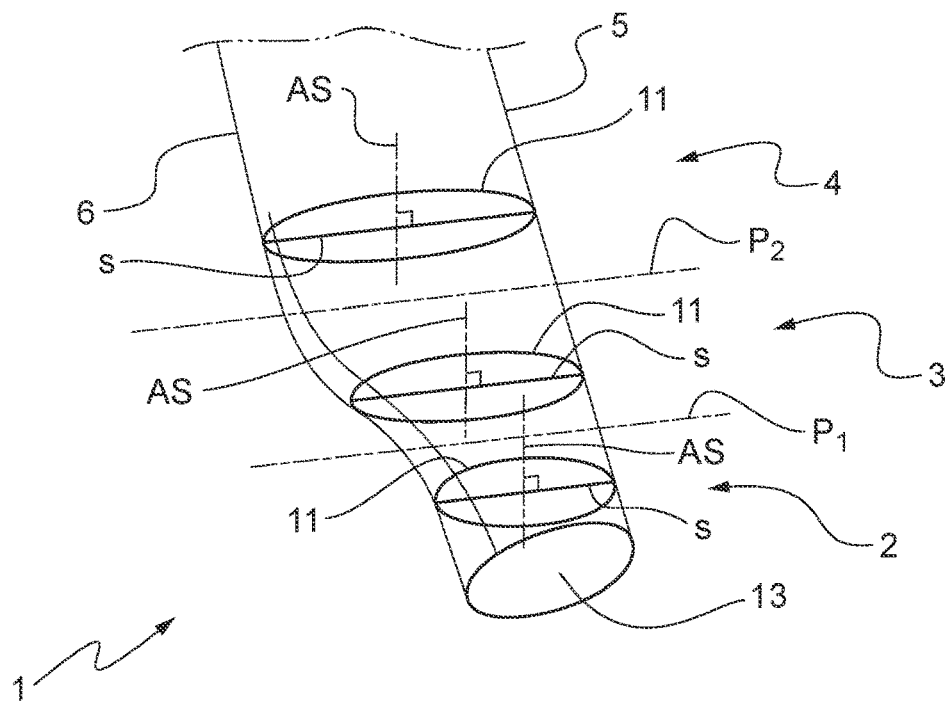
FIG. 3 is a detailed perspective view of the blade.

The blade root 2, the blade neck 3 and part of the profiled zone 4 of the blade 1 are shown in greater detail in FIG. 3.

The profiled zone 4 of the blade 1 is responsible for the main aerodynamic performance of the blade 1 and, in particular, the aerodynamic lift force generated when the blade 1 is swept by an air flow, in particular when the blade 1 is rotating and/or the rotorcraft 50 is travelling forwards. The profiles 11 of the profiled zone 4 of the blade 1 can be profiles referred to as "thin" profiles with a relative thickness less than 13%. This profiled zone 4 represents a relatively long portion of the blade 1.

The blade root 2 is intended to be fastened to the hub 12, optionally by means of a structural joining device. The profiles 11 of this blade root 2 may, for example, have a relative thickness that is, for example, between 50% and 100%.

The blade neck 3 provides the geometric and structural connection between the blade root 2 and the profiled zone 4. The profiles 11 of this blade neck 3 may, for example, have a relative thickness that is, for example, between 13% and 50%.

On the blade root 2, the blade neck 3 and a central part of the profiled zone 4 of the blade 1, each profile 11 is referred to as a "mirror" profile and is axially symmetrical relative to an axis of symmetry AS, perpendicular to the segment s and passing through the middle of this segment s. The central part 41 of the profiled zone 4 extends from the second plane P2 up to a third plane P3 parallel to the second plane P2.

The profiles on the outer part 42 of the profiled zone 4 of the blade 1, i.e., the profiles situated between the third plane P3 and the second free end 14 of the blade 1, can have profiles referred to as "standard" profiles, for example comprising a trailing edge section with a tapered or thin trailing edge 6. A standard profile can be defined, for example, according to the NACA families or indeed the OA families.

The outer part 42 of the profiled zone 4 of the blade 1 comprises a transition zone (not shown), adjacent to the central part 41 of the profiled zone 4, in order to transition gradually from mirror profiles 11 to standard profiles.

Therefore, the behaviors of the mirror profiles 11, at the blade root 2, the blade neck 3 and the central part 41 of the profiled zone 4 are advantageously similar for the same angle of incidence of the blade 2, whether the mirror profiles 11 are swept by a flow of air circulating from the leading edge 5 towards the trailing edge 6, or conversely by a flow of air circulating from the trailing edge 6 towards the leading edge 5.

The third plane P3 can correspond substantially to the outer limit of the inversion circle of maximum radius for the air flow sweeping each blade 1 when the rotorcraft 50 is flying. This maximum radius depends on the maximum forward speed of the rotorcraft 50 and the speed of rotation of the rotor 10 associated with the maximum forward speed of the rotorcraft 50. This maximum radius of the inversion circle is, for example, of the order of 60% of a total span of the blade 1 from the axis of rotation of the rotor 10 in the case of the rotorcraft 50 shown in FIG. 1.

Moreover, the inversion circle is tangent to a longitudinal direction of the rotorcraft 50 at the axis of rotation of the rotor 10.

Consequently, during forward flight of the rotorcraft 50 at forward speeds close to its maximum speed, the blade root 2, the blade neck 3 and the central part 41 of the profiled zone 4 of each retreating blade 1 are situated in the inversion circle. Each retreating blade 1 according to the disclosure therefore has better aerodynamic performances than a retreating blade comprising only standard profiles.

In particular, the aerodynamic lift force generated by the retreating blade 1 is increased compared to a blade with a tapered or thin trailing edge and the aerodynamic drag force generated by this retreating blade 1 is also reduced compared to a blade with a tapered or thin trailing edge. The aerodynamic stall point of a retreating blade 1 is also modified, which helps improve the aerodynamic behavior of the blade 1.

Figure 4:
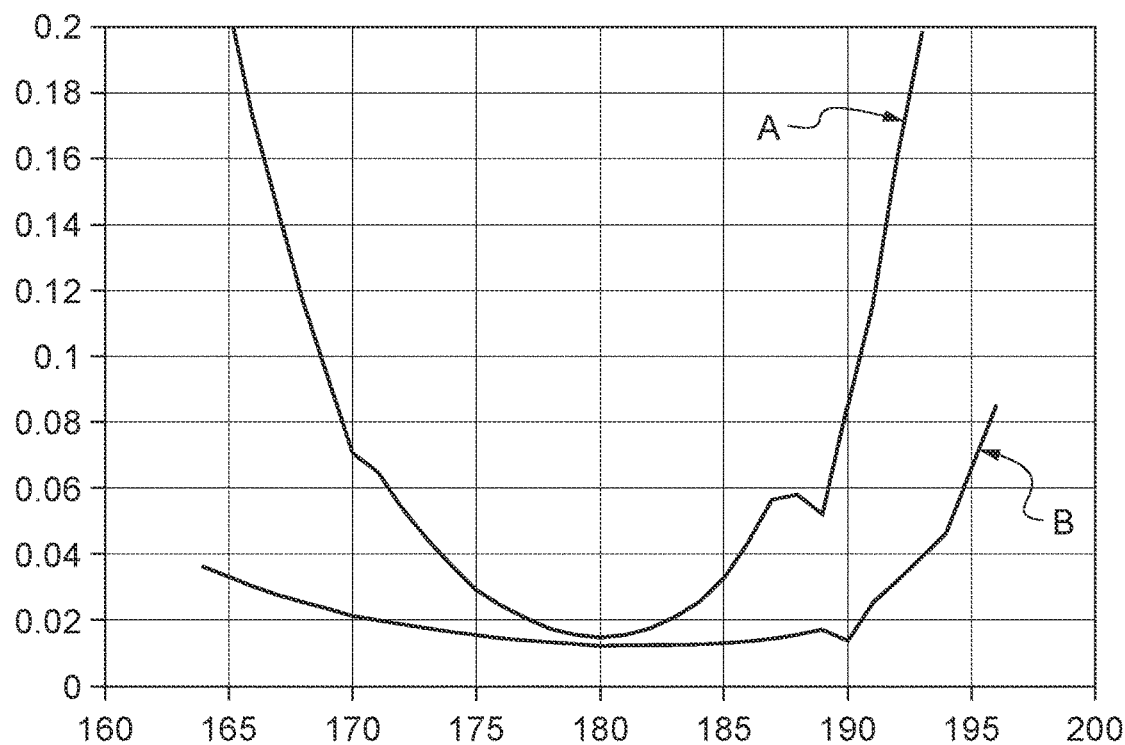
FIG. 4 is a performance graph of the blade.

Moreover, the moment coefficient of a retreating blade 1 can be significantly reduced depending on the angle of incidence of the blade 1, as the graph in FIG. 4 shows, due to the presence of a trailing edge section 16 that is thicker than a trailing edge section of a standard profile. This growth shows a first variation curve A of the moment coefficient of a retreating blade 1 having only standard profiles and a second variation curve B of the moment coefficient of a retreating blade 1 according to the disclosure. It can be seen that the second curve B has a smaller amplitude of variation than the first curve A and is always situated below the first curve A. A reduction in this moment coefficient of the blade advantageously makes it possible to reduce the forces for controlling the pitch of the blade 1.

Figure 5:
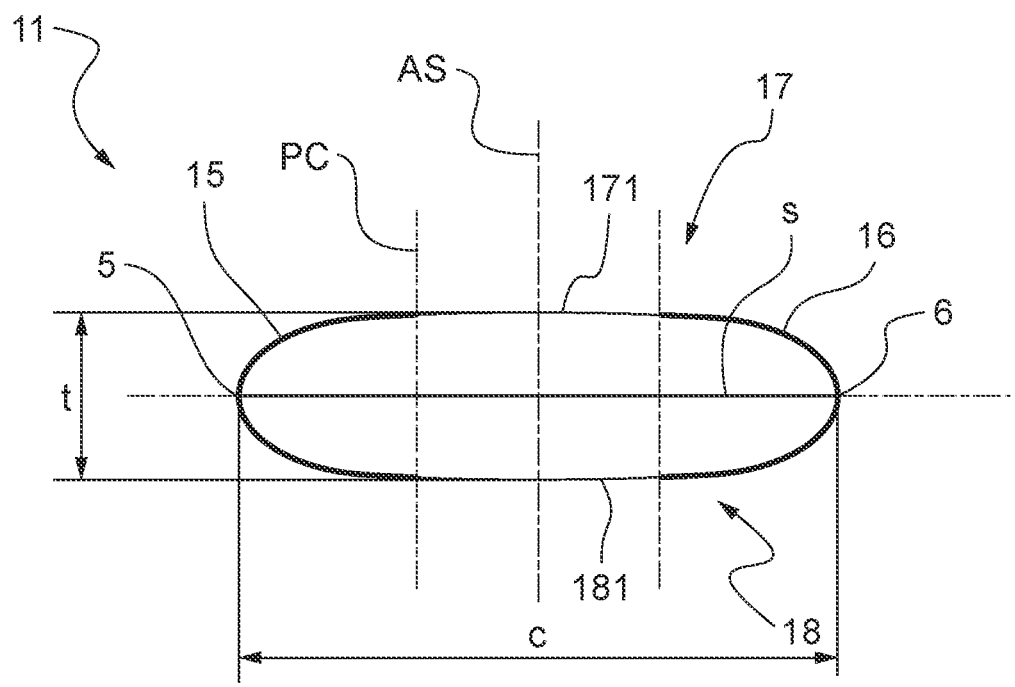
FIG. 5 is a section of a mirror profile of the blade.

A mirror profile 11 of the blade 1 is shown in FIG. 5. This mirror profile 11 comprises a leading edge section 15, a trailing edge section 16, an intermediate upper surface section 171 and an intermediate lower surface section 181.

Figure 6:
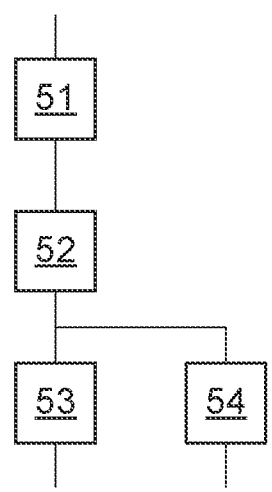
FIG. 6 is an overview diagram of a method according to the disclosure.
Figure 7:
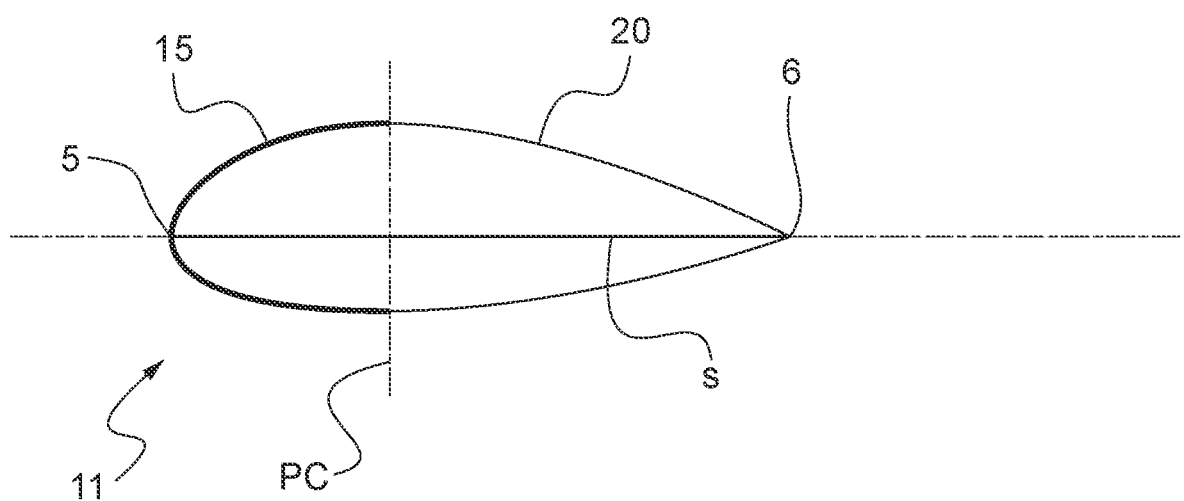
FIG. 7 is a section of a mirror profile of the blade.

The blade 1 can be constructed by applying a method for constructing a blade 1 for a rotor 10 of a rotorcraft 50. This method may comprise four main steps 51-54 as shown in the overview diagram in FIG. 6.

Firstly, a step of determining 51 a leading edge section 15 of each profile 11 for the blade root 2, the blade neck 3 and a central part 41 of the profiled zone 4 is carried out. This leading edge section 15 extends from the leading edge 5 to a point upstream from a point of maximum thickness of the profile 11. For example, the leading edge section 16 extends up to a distance from the leading edge 5 of between 20 and 45% of the chord c of the profile 11 over the segment s.

In particular, the leading edge section 15 can extend from the leading edge 6 up to a cutting plane PC perpendicular to the segment s.

Moreover, the leading edge section 16 can be taken from an existing profile, for example a standard profile 20.

Figure 8:
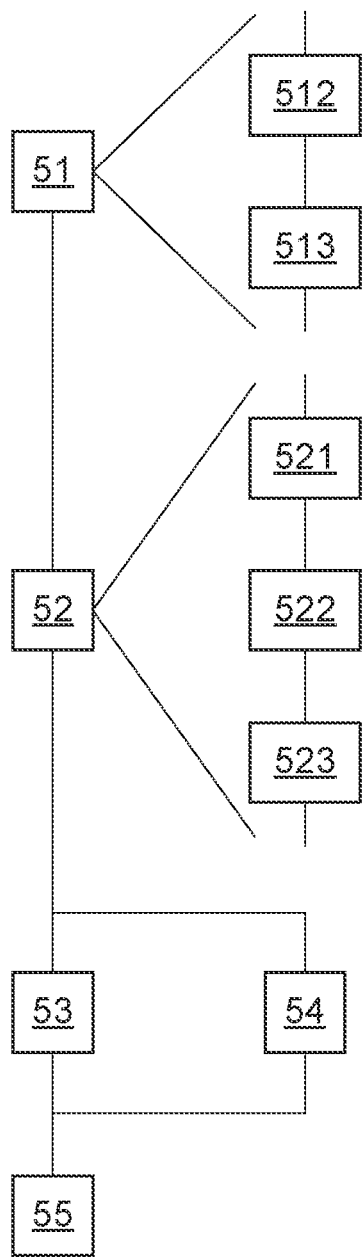
FIG. 8 is an overview diagram of a method according to the disclosure.
Figure 9:
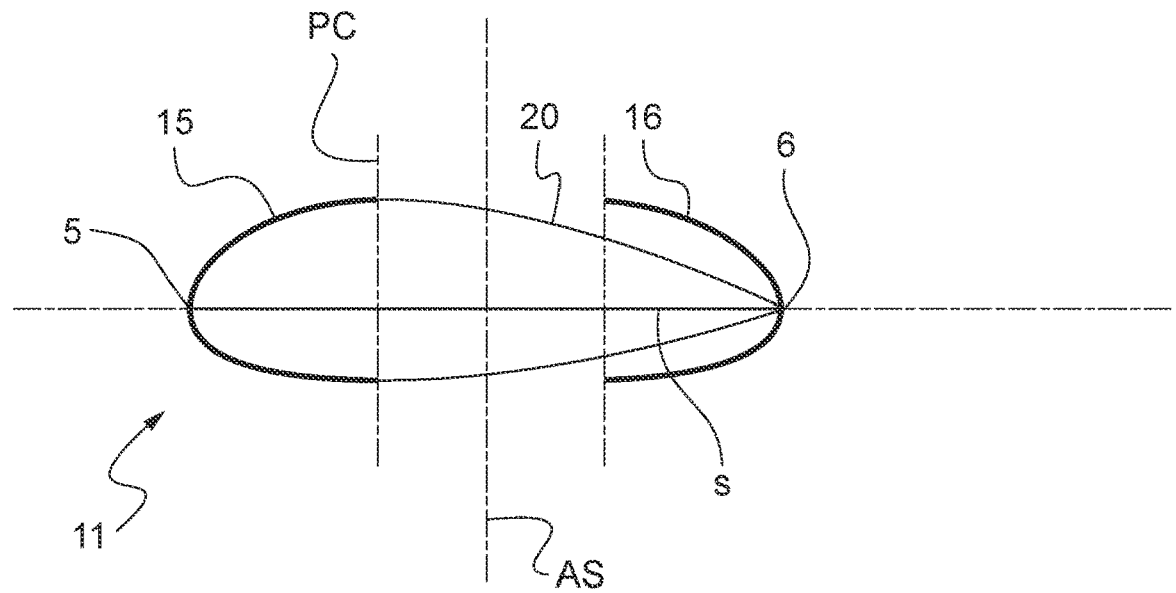
FIGS. 9 and 10 are sections of mirror profiles of the blade.
Figure 10:
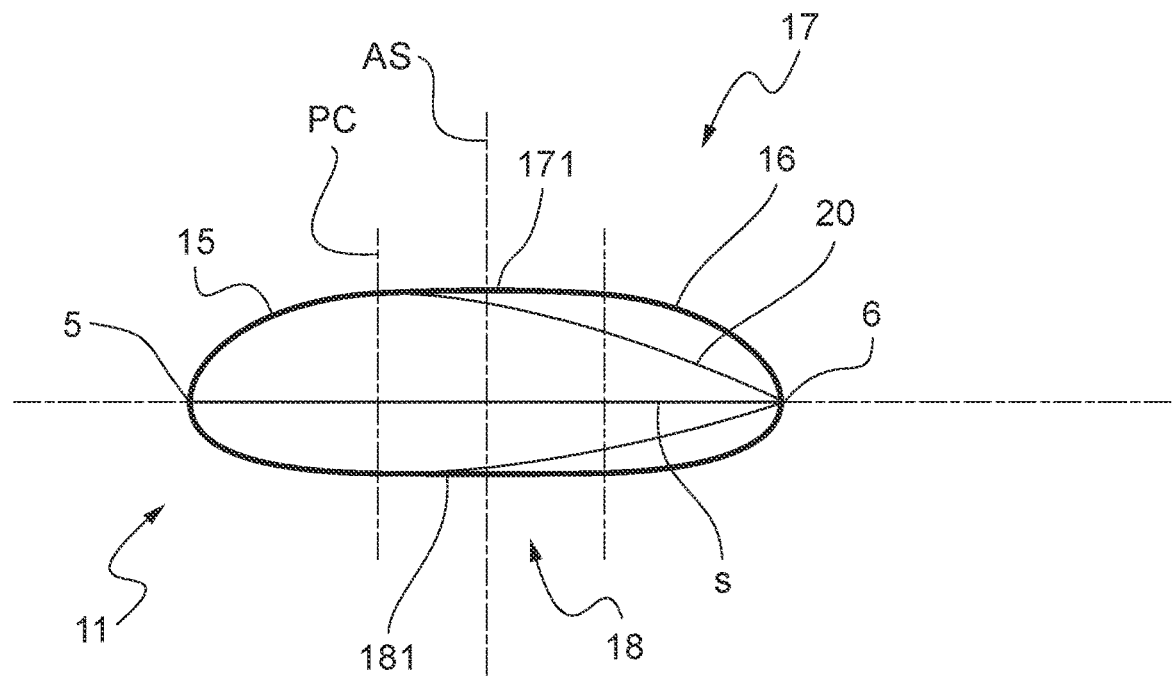

In this case, the first step of determining 51 a leading edge section 15 can comprise the following sub-steps according to the overview diagram shown in FIG. 8:

a sub-step of defining 512 a cutting plane PC situated between the leading edge 5 and the point of maximum thickness of the aerodynamic profile 11; and a sub-step of defining 513 the leading edge section 15 by cutting the aerodynamic profile 11 along the cutting plane PC, the leading edge section 15 comprising the leading edge 5.

The cutting plane PC may, for example, be situated in a position slightly upstream of the position of maximum thickness of the profile 11, i.e., between the leading edge 5 and this point of maximum thickness, in order to ensure that the mirror profile 11 is convex, i.e., that the upper surface 17 and the lower surface 18 of each profile 11 are convex.

Next, a step of determining 52 a trailing edge section 16 of each profile 11 for the blade root 2, the blade neck 3 and the central part of the profiled zone 4 is carried out by axial symmetry of the leading edge section 15.

During this determination step 52, a profile part axially symmetrical to the leading edge section 15 is then attached at the trailing edge 6 in order to form the trailing edge section 16. This profile part symmetrical to the leading edge section 15 is obtained by axial symmetry along an axis of symmetry AS.

Moreover, the second step of determining 52 a trailing edge section 16 can comprise the following sub-steps detailing how the trailing edge section 16 is obtained:

a sub-step of defining 521 the segment s connecting the leading edge 5 and the trailing edge 6 of the profile 11;

a sub-step of defining 522 the axis of symmetry AS, said axis of symmetry AS being, for example, the right bisector of the segment s; and a sub-step of defining 523 the trailing edge section 16 by axial symmetry of the leading edge section 15 according to the axis of symmetry AS.

Next, a step of determining 53 an intermediate upper surface section 171 connecting the leading edge section 15 and the trailing edge section 16 in order to form an upper surface 17 of the profile 11 and a step of determining 54 an intermediate lower surface section 181 connecting the leading edge section 15 and the trailing edge section 16 in order to form a lower surface 18 of the profile 11 are carried out.

These steps of determining 53, 54 an intermediate upper surface section 171 and an intermediate lower surface section 181 can be carried out simultaneously or indeed sequentially, whereas the steps of determining 51, 52 a leading edge section 15 and a trailing edge section 16 of each profile 11 are carrying out sequentially.

Moreover, during the third step of determining 53 the intermediate upper surface section 171, the intermediate upper surface section 171 is tangent to the leading edge section 15 and to the trailing edge section 16. Similarly, during the fourth step of determining 54 the intermediate lower surface section 181, the intermediate lower surface section 181 is tangent to the leading edge section 15 and to the trailing edge section 16. The intermediate upper surface section 171 and the intermediate lower surface section 181 thus advantageously allow tangential continuity between the leading edge section 15 and trailing edge section 16 of the profile 11. The intermediate upper surface section 171 and the intermediate lower surface section 181 can be defined respectively, for example, by a polynomial of degree greater than or equal to two.

Moreover, the intermediate upper surface section 171 and the intermediate lower surface section 181 may respectively be axially symmetrical relative to the axis of symmetry AS, such that the whole of the profile 11 is symmetrical relative to the axis of symmetry AS.

The intermediate upper surface section 171 and the intermediate lower surface section 181 may also be defined such that the maximum thickness t of the profile 11 of the blade 1 is substantially identical to the maximum thickness of the standard profile 20 used to define the leading edge section 15. However, a small change in this maximum thickness of the standard profile 20 can be obtained, and correspond to a variation in thickness, for example of the order of +/−5%.

Finally, another object of the present disclosure is a method for manufacturing a blade 1 for a rotorcraft rotor 10, the aim of which is to manufacture the blade 1 according to the aerodynamic profiles 11 for the blade root 2, the blade neck 3 and the central part 41 of the profiled zone 4.

To this end, the manufacturing method comprises the steps of determining 51 a leading edge section 15 of each profile 11, of determining 52 a trailing edge section 16 of each profile 11, of determining 53 an intermediate upper surface section 171 and of determining 54 the intermediate lower surface section 181 and a step 55 of manufacturing the blade 1.

Naturally, the present disclosure is subject to numerous variations as regards its implementation. Although several implementations are described above, it should readily be understood that an exhaustive identification of all possible embodiments is not conceivable.

In particular, although the blade 1 that is described belongs to a main rotor 10 of a rotorcraft 50, a blade 1 according to the disclosure may also be applied to an auxiliary rotor, for example an anti-torque rear rotor. It is naturally possible to replace any of the means described with equivalent means without going beyond the ambit of the present disclosure.

What is claimed is:

1. A method for manufacturing a blade for a rotor of a rotorcraft, the blade extending in a longitudinal direction spanwise from a first end intended to be connected to a hub of the rotor towards a second free end, and in a transverse direction from a leading edge towards a trailing edge, the blade comprising a blade root including the first end, a profiled zone having (i) a central part and (ii) an outer part including the second free end, and a blade neck situated between the blade root and the central part of the profiled zone, the blade root, the blade neck, and the profiled zone comprising a series of aerodynamic profiles;

wherein the method comprises the following steps:

determining a leading edge section of each aerodynamic profile for the blade root, the blade neck, the central part of the profiled zone, and the outer part of the profiled zone;

determining a trailing edge section of each aerodynamic profile for the blade root, the blade neck, and the central part of the profiled zone by axial symmetry of the leading edge section along an axis of symmetry perpendicular to a segment connecting the leading edge to the trailing edge and positioned in the middle of the segment whereby for each aerodynamic profile for the blade root, the blade neck, and the central part of the profiled zone the trailing edge section is axially symmetrical to the leading edge section;

determining a trailing edge section of each aerodynamic profile for the outer part of the profiled zone that is tapered relative to the leading edge section of the aerodynamic profile whereby for each aerodynamic profile for the outer part of the profiled zone the trailing edge section is not symmetric to the leading edge section;

determining an intermediate upper surface section of each aerodynamic profile connecting the leading edge section and the trailing edge section of the aerodynamic profile;

determining an intermediate lower surface section of each aerodynamic profile connecting the leading edge section and the trailing edge section of the aerodynamic profile; and manufacturing the blade according to the aerodynamic profiles by forming for each aerodynamic profile (i) an upper surface of the aerodynamic profile comprised of the intermediate upper surface section of the aerodynamic profile connecting the leading edge section and the trailing edge section of the aerodynamic profile and (ii) a lower surface of the aerodynamic profile comprised of the intermediate lower surface section of the aerodynamic profile connecting the leading edge section and the trailing edge section of the aerodynamic profile.

2. The method according to claim 1 wherein the blade root, the blade neck, and the central part of the profiled zone extend within an inversion circle of maximum radius for the rotorcraft, the inversion circle being the location of inversion of the air flow sweeping the blade during a rotation of the rotor, the central part of the profiled zone being situated entirely within the inversion circle of maximum radius and the outer part of the profiled zone being situated entirely beyond the inversion circle of maximum radius, the maximum radius depending on a maximum forward speed of the rotorcraft and a speed of rotation of the rotor associated with the maximum forward speed of the rotorcraft.

3. The method according to claim 2 wherein the inversion circle is tangent to a longitudinal direction of the rotorcraft at an axis of rotation of the rotor.

4. The method according to claim 1 wherein the central part of the profiled zone extends up to a distance less than or equal to 60% of a total span of the blade from an axis of rotation of the rotor.

5. The method according to claim 1 wherein the leading edge section of each aerodynamic profile extends from the leading edge to a point upstream from a point of maximum thickness of the aerodynamic profile.

6. The method according to claim 1 wherein the leading edge section of each aerodynamic profile extends over a distance of between 20 and 40% of a chord of the aerodynamic profile according to a segment connecting the leading edge and the trailing edge of the aerodynamic profile, the chord being equal to a distance between the leading edge and the trailing edge.

7. The method according to claim 1 wherein the step of determining a leading edge section comprises the following sub-steps:
defining a cutting plane situated between the leading edge and the point of maximum thickness of an existing profile; and
defining the leading edge section by cutting the existing profile along the cutting plane, the leading edge section comprising the leading edge.

8. The method according to claim 7 wherein the cutting plane is perpendicular to a segment connecting the leading edge and the trailing edge of the existing profile and is situated at a distance from the leading edge of between 20 and 45% of a chord according to the segment, the chord being equal to a distance between the leading edge and the trailing edge.

9. The method according to claim 1 wherein the step of determining a trailing edge section of each aerodynamic profile for the blade root, the blade neck, and the central part of the profiled zone comprises the following sub-steps:
defining the segment connecting the leading edge and the trailing edge of the aerodynamic profile;
defining the axis of symmetry, the axis of symmetry being a right bisector of the segment and
defining the trailing edge section by axial symmetry of the leading edge section according to the axis of symmetry.

10. The method according to claim 1 wherein, during the step of determining the intermediate upper surface section, the intermediate upper surface section is tangent to the leading edge section and to the trailing edge section and is defined by a polynomial of degree greater than or equal to two and, during the fourth step of determining the intermediate lower surface section, the intermediate lower surface section is tangent to the leading edge section and to the trailing edge section and is defined by a polynomial of degree greater than or equal to two.

11. The method according to claim 10 wherein the intermediate upper surface section and the intermediate lower surface section are symmetrical relative to the axis of symmetry.

12. A blade for a rotor of a rotorcraft, the blade extending in a longitudinal direction spanwise from a first end intended to be connected to a hub of the rotor towards a second free end, and in a transverse direction from a leading edge towards a trailing edge, the blade comprising a blade root including the first end, a profiled zone having (i) a central part and (ii) an outer part including the second free end, and a blade neck situated between the blade root and the central part of the profiled zone, the blade root, the blade neck, and the profiled zone comprising a series of aerodynamic profiles;
wherein, for the blade root, the blade neck, and a—the central part of the profiled zone, each aerodynamic profile comprises a leading edge section and a trailing edge section that are axially symmetrical to each other along an axis of symmetry perpendicular to a segment connecting the leading edge to the trailing edge and positioned in the middle of the segment; and
wherein, for the outer part of the profiled zone, each aerodynamic profile comprises a leading edge section and a trailing edge section that are not symmetric to each other as the trailing edge section is tapered relative to the leading edge section.

13. The blade according to claim 12 wherein, for the blade root, the blade neck, and the central part of the profiled zone adjacent to the blade neck, each aerodynamic profile is symmetrical along the axis of symmetry.

14. The blade according to claim 12 wherein the blade root, the blade neck, and the central part of the profiled zone extend within an inversion circle of maximum radius for the rotorcraft, the inversion circle being the location of inversion of the air flow sweeping the blade during a rotation of the rotor, the central part of the profiled zone being situated entirely within the inversion circle of maximum radius and the outer part of the profiled zone being situated entirely beyond the inversion circle of maximum radius, the maximum radius depending on a maximum forward speed of the rotorcraft and a speed of rotation of the rotor associated with the maximum forward speed of the rotorcraft.

15. The blade according to claim 12 wherein the central part of the profiled zone extends up to a distance equal to 60% of a total span of the blade from an axis of rotation of the rotor.

16. A rotor for a rotorcraft, the rotor comprising a hub and at least two blades
wherein each blade is according to claim 12.

17. The rotorcraft comprising at least one rotor equipped with at least two blades
wherein the blades are according to claim 12.

* * * * *